United States Patent [19]

Lembke

[11] Patent Number: 5,314,118
[45] Date of Patent: May 24, 1994

[54] PIEZOELECTRIC CONTROLLABLE NOZZLE RESISTANCE FOR HYDRAULIC APPARATUS

[75] Inventor: Herbert Lembke, Lohr, Fed. Rep. of Germany

[73] Assignee: Mannesmann Rexroth GmbH, Lohr, Fed. Rep. of Germany

[21] Appl. No.: 834,774

[22] Filed: Feb. 13, 1992

[30] Foreign Application Priority Data

Feb. 14, 1991 [DE] Fed. Rep. of Germany ....... 4104541
Oct. 30, 1991 [DE] Fed. Rep. of Germany ....... 4135822

[51] Int. Cl.[5] .............................................. F16K 31/02
[52] U.S. Cl. ........................... 239/102.2; 251/129.06; 251/129.11; 137/596.16
[58] Field of Search .................. 251/129.06, 129.11; 137/596.16; 239/102.2

[56] References Cited

U.S. PATENT DOCUMENTS

| | | | |
|---|---|---|---|
| 2,836,196 | 5/1958 | Gunn | 137/596.16 |
| 3,294,120 | 12/1966 | Ruchser | 137/596.16 |
| 3,870,073 | 3/1975 | Ruchser et al. | 137/596.16 |
| 4,284,263 | 8/1981 | Newcomb | 251/129.06 |
| 4,316,486 | 2/1982 | Tandrup et al. | 137/596.16 |
| 4,803,393 | 2/1989 | Takahashi . | |
| 5,092,360 | 3/1992 | Watanabe et al. | 251/129.06 |
| 5,094,430 | 3/1992 | Shirai et al. | 251/129.06 |

FOREIGN PATENT DOCUMENTS

| | | |
|---|---|---|
| 1776142 | 7/1971 | Fed. Rep. of Germany . |
| 2402085 | 8/1974 | Fed. Rep. of Germany . |
| 2417450 | 10/1975 | Fed. Rep. of Germany . |
| 2511752 | 10/1976 | Fed. Rep. of Germany . |
| 2918377 | 11/1980 | Fed. Rep. of Germany . |
| 3037078 | 4/1982 | Fed. Rep. of Germany . |
| 3527069 | 2/1986 | Fed. Rep. of Germany . |
| 3922504 | 6/1990 | Fed. Rep. of Germany . |
| 0176872 | 7/1989 | Japan .................. 251/129.06 |
| 0286982 | 11/1990 | Japan .................. 251/129.06 |
| 1217225 | 12/1970 | United Kingdom . |
| 1410312 | 10/1976 | United Kingdom . |

*Primary Examiner*—Andres Kashnikow
*Assistant Examiner*—Christopher G. Trainor
*Attorney, Agent, or Firm*—Cushman, Darby & Cushman

[57] ABSTRACT

A nozzle resistance controlled by a piezoelectric element comprises a housing having a longitudinal bore, a piezoelectric element located in the longitudinal bore, a baffle plate supported by the piezoelectric element, a nozzle body located in the longitudinal bore such, that the bore extending through the nozzle body ends with one end adjacent to the baffle plate, and a chamber defined by the longitudinal bore and connected to the other end of the bore. The chamber is connected to a fluid supply device.

8 Claims, 4 Drawing Sheets

Fig.7  $\dfrac{41}{42} = \dfrac{44}{43}$

PIEZOELECTRIC CONTROLLABLE NOZZLE RESISTANCE FOR HYDRAULIC APPARATUS

This invention relates to a nozzle resistance (also called a jet resistance or an orifice resistance) which is controlled by piezoelectric means. The invention relates more specifically to pilot means of a servo valve. Moreover, the present invention relates to an apparatus for generating a hydraulic output signal corresponding to an electrical input signal, said apparatus being specifically useful in a two stage or multi stage servo valve.

BACKGROUND OF THE INVENTION

German patent 17 76 142 discloses an apparatus for adjusting the position of a mechanical member by means of an electroexpansive module. As an example of an electroexpansive material a piezoelectric material is mentioned. Said module comprises a surface bordering a chamber filled with liquid. Said chamber is connected to a first chamber of a spool valve. In said chamber a first spool is movably mounted. Said first spool can be moved from its centered position into one or the opposite direction by applying different electrical voltages to the electroexpansive module. For the adjustment of the position of said mechanical element a second spool is provided in a second spool valve chamber which is connected with said first spool valve chamber. The first mentioned chamber which is filled with liquid is of a fluid tight design and said first spool is maintained in its center position by a spring against the pressure in said chamber. Depending on the position of the spool the desired movement of the mechanical element is obtained.

British patent GB 1 217 225 relates to a fluid flow directing device, comprising a chamber into which fluid enters via an inlet and exits via an outlet. Adjacent to the inlet and/or outlet a baffle element is provided which forms a gap so as to influence the flow of fluid. This baffle element is arranged on a piezoelectric unit which in turn can be controlled by means of electrical signals.

DE-OS 24 17 450 relates to an electro hydraulic signal transducer which transforms the differences in the flow of an electrical control current into differences of viscosity in an operating liquid. This electrohydraulic signal transducer can be used as the pilot control stage of a proportional and/or a servo valve. When used as the pilot stage of a servo valve it is desirable to form a complete bridge and to use the peltier element with two constant hydraulic resistances for the feed back of the electrical signals. DE-OS 3527069 and 25 11 752 relate to additional prior art.

SUMMARY OF THE INVENTION

In a first aspect of the invention a piezo electrically controlled nozzle resistance is provided for hydraulic apparatus. The nozzle resistance comprises a housing having a longitudinal bore. In said longitudinal bore a piezoelectric element is arranged and supports a baffle plate. In said longitudinal bore a nozzle body is arranged such that a bore extending through the nozzle body ends with one end in a first chamber adjacent to said baffle plate. Preferably, said bore extends axially within said nozzle body. A hollow space or second chamber is formed, preferably in said nozzle body. Said bore in the nozzle body has another end in communication with said second chamber. One or a plurality of radially extending bores communicate the first chamber with the outside to supply a hydraulic output signal. Also, one or a plurality of radial bores end in said second chamber and are also connected to the outside by means of respective radial bores in the housing so as to receive pressurized fluid.

The nozzle resistance forms a compact, self-contained and preadjusted element which can be used in circuit arrangements as an already checked unit. The nozzle resistance of the invention has no mechanically movable components which could cause friction and wear. The nozzle resistances are preferably in the form of individual elements and thus are easily accessible for maintenance. A high degree of "zero" stablility is obtained due to the high stiffness of the piezoelectric elements which are used in the nozzle resistance.

In another aspect of the invention the nozzle resistances are used as pilot means for servo valves. Inasmuch as the resonance frequency of the piezoelectric elements (or discs) is about 10 kHz for the range of small signals, and because the signal transfer to the hydraulic apparatus is without any delay the quality of control is high in connection with a position control of the control spool. Also, a high control of the adjustment of the piezoelectric element can be achieved. The feedback of the position will eliminate the hysteresis of the piezoelectric element, depending on the electrical gain of the closed loop.

When applying a polarized voltage to the piezoelectric element, the element will expand proportionally. Thus, the nozzle resistance will be changed, i. e. increased or decreased when the piezoelectic element is energized, due to the variation of the cross section of the output of the nozzle between said nozzle body bore and said baffle plate.

In accordance with a prefered embodiment of the invention the control voltage for the piezoelectric element is limited by electrical means, such that no mechanical contact occurs between the piezoelectric element (or the baffle plate, supported by the piezoelectric element) and the nozzle present in the nozzle resistance. Otherwise, the very high piezoelectric force might cause damage of the nozzle.

Preferably, the electrical input control signal will be supplied by a highly stabilized voltage source so as to able to make use of the extremely high resolution of the piezoelectric element or translator. In addition, the voltage is limited by a Zener diode to the maximum voltage for reasons of safety. The control signal can be amplified by a voltage amplifier to the voltage required for the operation of the piezoelectric element.

In another aspect of the invention the piezoelectrically controlled nozzle resistance is used for pilot control tasks in servo valves. Predominantly, the control spool of a servo valve is moved into and positioned in a control position by means of delta P and delta Q; i. e. the pressure differential or the differential of the amount of fluid flow. Thus, in accordance with the invention a control system is provided having two resistance elements each in series with a fixed orifice. They are used together with a hydraulic center tap. To obtain the proper function it is neccessary to control simultanously in an analog manner said two nozzle resistances. Which pair of nozzles is required results from the polarity of the control deviation of the position of the control spool obtained by means of a switching logic. For the control deviation "zero" no resistance element is controlled. The same control of the input nozzle on the one side of the system and the simultanous control of the outlet nozzle on the other side of the system generate the same pilot output signal as the nozzle-baffle plate or flapper system of the prior art.

With the above mentioned combination of nozzle resistance elements a higher electrical amplification can be used, inasmuch as the hydraulic amplification is reduced.

In accordance with another aspect of the invention it is possible to bias the piezoelectric element (or a stack of piezoelectric elements) so that a movement can occur both in the direction of plus and minus. This will lead to another increase of the available hydraulic power. In accordance with a still further aspect of the invention it is possible to arrange two nozzle resistance elements in series with a hydraulic center tap and to double this circuit arrangement.

Depending on the desired use the one or the other combination of resistance elements is used.

It is an object of the present invention to provide a piezoelectrically controlled nozzle resistance such that it is compact in design, not expensive to manufacture and easily adjustable.

It is another object of the invention to provide the first stage of a multistage, specifically a two stage servo valve. Generally speaking, the first stage of a servo valve comprises a so called control motor and a hydraulic amplifier. For details see page 150 of the book "The Hydraulic Trainer", published by Mannesmann Rexroth in 1981. The first stage changes an electrically controlled signal applied to the control motor into a hydraulic signal which actuates the second stage.

BRIEF DESCRIPTION OF THE DRAWINGS

For a fuller understanding of the nature and the objects of the invention reference should be had to the following detailed description, taken in connection with the accompanying drawings, in which.

DESCRIPTION OF THE PREFERRED EMBODIMENTS

Figure 1:
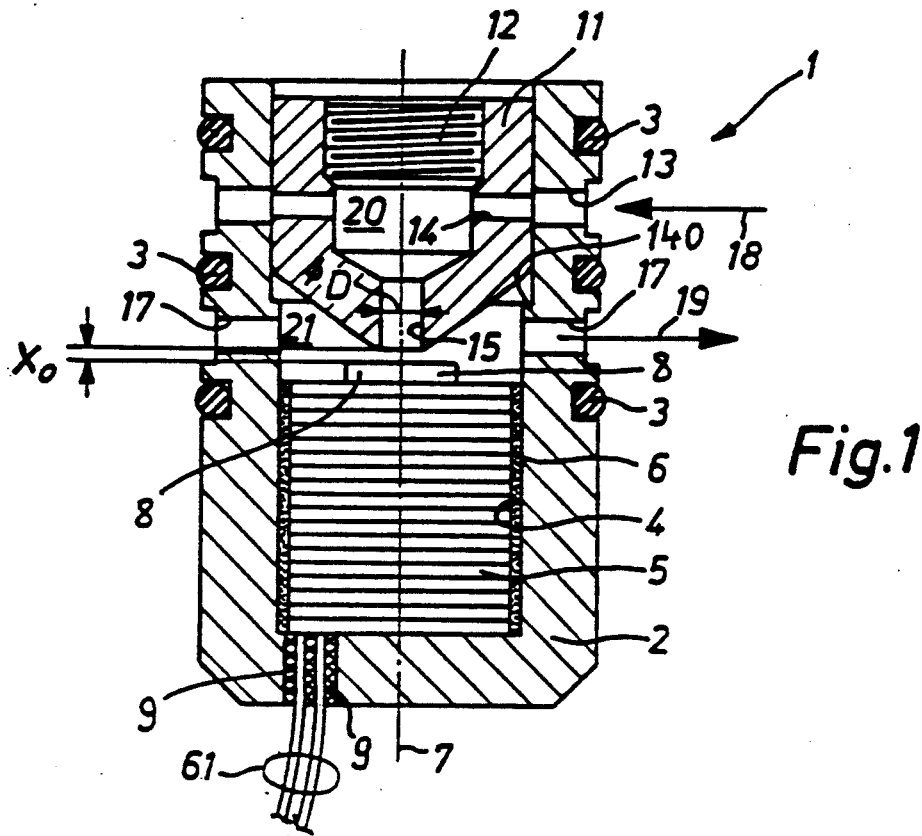
FIG. 1 is a longitudinal sectional view of a controllable nozzle resistance in accordance with the invention.

Referring to FIG. 1 of the drawings, a nozzle resistance (also called jet resistance or orifice resistance) 1 is disclosed as being controlled by a piezoelectric means. The following description will refer to said resistance 1 as piezo controlled nozzle resistance or simply as nozzle resistance 1.

The nozzle resistance 1 comprises a rotation-symetric housing 2 in the form of a sleeve. At the outer surface of said housing 2 grooves are provided which are adapted to receive seals 3. A longitudinal bore 4 (preferably stepped as at 140) extends inside of said housing 2. Reference numeral 5 refers to a piezoelectric element which, for practical purposes, consists of a stack of a plurality of piezoelectic disks. The piezoelectric element 5 comprising—as shown a plurality of individual piezoelectric elements—can also be refered to as a piezoelectric translator and is fixedly mounted to a bottom of said bore 4 by means of a sealing and fixing material 6. At its upper end the piezoelectric element 5 is provided with a baffle plate 8. At the bottom of the housing 2 a pressure sealed cable passage 9 is shown for passing an input cable 6, by means of which an electrical input signal 28 can be supplied to said piezoelectric element 5.

A nozzle body 11 fits into said bore 4 and is fixedly mounted therein such that it ends adjacent to said baffle plate 8. Like the piezoelectric element 5 the nozzle body 11 is located in rotational symmetry to the longitudinal axis 7 of the housing 2 of the nozzle resistance 1. Within the nozzle body 11 a hollow space or nozzle chamber 20 is formed. Said chamber 20 is closed at one end by means of a plug (not shown) which is in threaded engagement with threads 12. At the opposite end, the nozzle body 11 is provided with an axial bore 15 having a diameter D and ending adjacent to said baffle plate 8.

Moreover, a plurality of circumferentially spaced radial bores 13 are provided in the housing 2. For alignment with said radial bores 13 radially extending bores 14 are provided in the nozzle body 11 so as to provide the connection between said nozzle chamber 20 and the outside of the housing 2.

It should be clear that in operation the sleeve-like housing 2 (which could also be called a cartridge) is inserted into the block of a hydraulic apparatus, for instance a valve block. Thus, arrow 18 in FIG. 1 shows schematically the input of a pressurized fluid, preferably a hydraulic oil, and arrow 19 shows the outlet for said fluid. Clearly, the outlet occurs via circumferentially spaced radial bores 17 extending between a control chamber 21 formed between the nozzle body 11 and the piezo electric element 5, and the outside of said housing 2.

Still referring to FIG. 1 it is noted that the distance between the upper surface of the baffle plate 8 and the lower end of the axial bore 15 is referred to by $X_o$. Said distance $X_o$ can be changed in its magnitude due to the control of the piezoelectric element 5 by means of the electrical signal 28. The movement or stroke of the piezoelectric element 5 can be in the area of 25 micrometers. Preferably the baffle plate 8 is made of hard metal or rubin material mounted on ceramic material.

The nozzle resistance 1 as shown in FIG. 1 is a compact element or unit which can be used for different applications. The unit is preferably already preadjusted and is self contained.

The nozzle resistance 1 as shown in FIG. 1 can be used by itself to provide, depending on the energization of the piezoelectric element 5 by an electric input signal 28, a hydraulic resistance of smaller or larger size.

Figure 2:
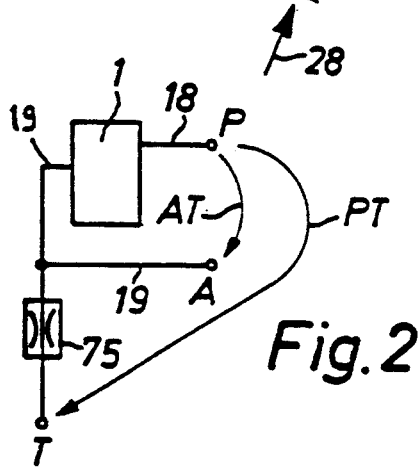
FIG. 2 discloses a first application of the nozzle resistance of FIG. 1.

FIG. 2 shows the application of the nozzle resistance 1 together with a fixed orifice or nozzle 75. As it is customary, P refers to a pump port, A refers to a user port and T refers to a tank port. The pressure differential between P and A is referred to as AT and the pressure differential between P and T is referred as PT.

Figure 3:
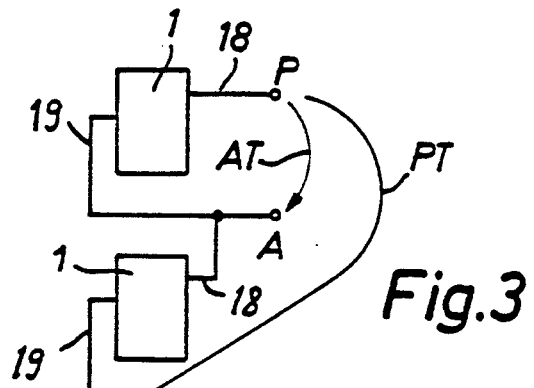
FIG. 3 discloses a second application of the nozzle resistance of FIG. 1.

FIG. 3 discloses two nozzle resistances 1 in series together with a hydraulic center tap. The pressure differentials are referred to as AT and PT similar to FIG. 2.

Figure 4:
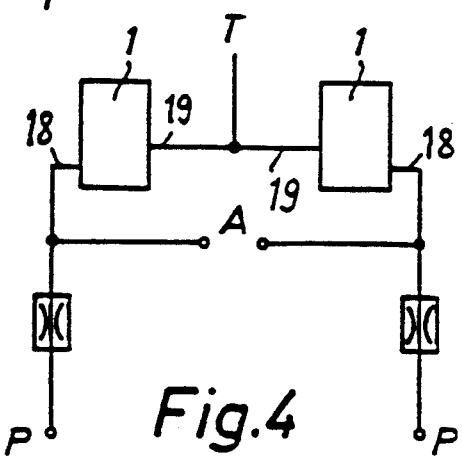
FIG. 4 discloses a third application of the nozzle resistance of FIG. 1.

FIG. 4 discloses a circuit arrangement similar to FIG. 2 however "doubled". Such a design can be preferably used for a servo valve for acuating a control spool which is subjected to pressure on both sides. This embodiment will be discussed below in more detail in connection with FIG. 8.

Figure 5:
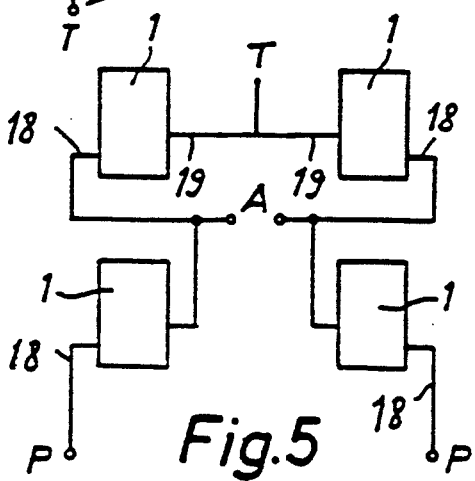
FIG. 5 discloses a forth application of the nozzle resistance of FIG. 1.

FIG. 5 discloses a circuit arrangement similar to FIG. 3, again "doubled". This design will be discussed in more detail when referring to FIG. 6 and 7 in connection with the actuation of the control spool.

Figure 6:
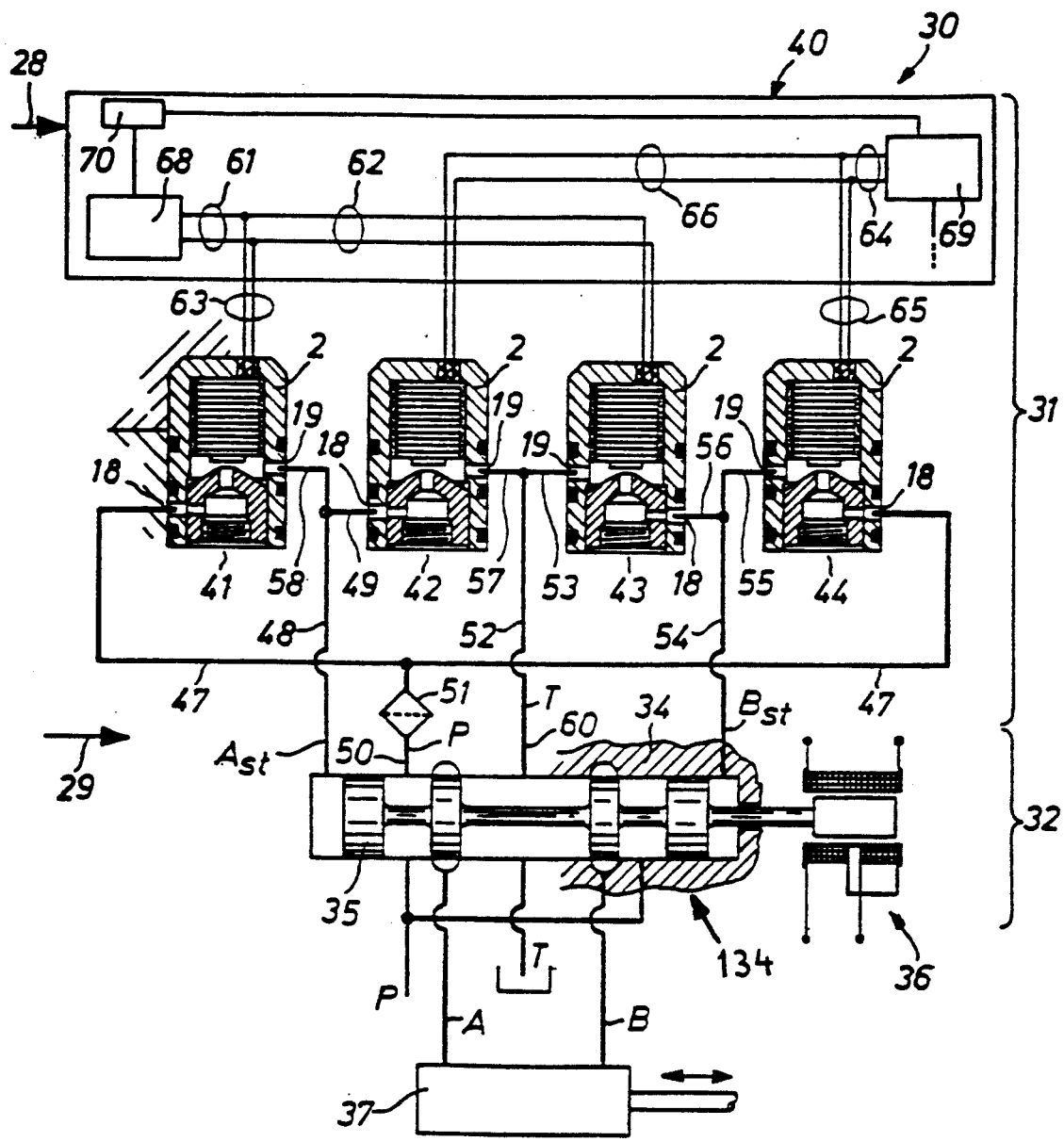
FIG. 6 discloses the use of the nozzle resistance of the invention in an apparatus for generating a hydraulic output signal corresponding to an electric input signal, said apparatus being adapted to be used as the first stage of a two stage servo valve.
Figure 9:
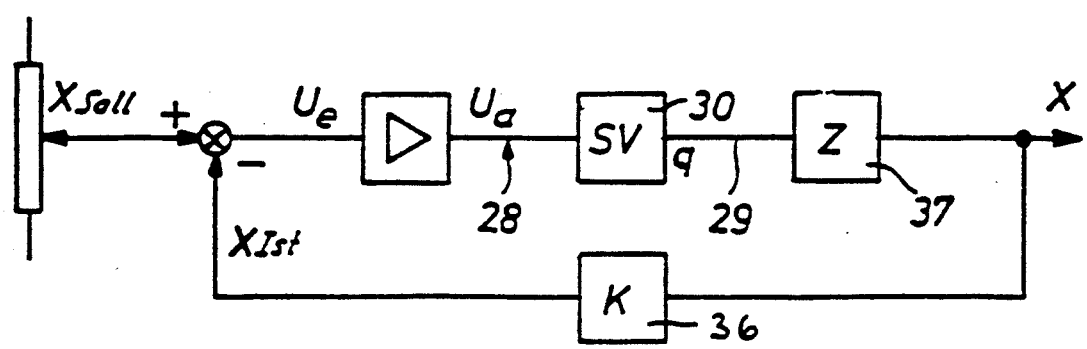
FIG. 9 is a circuit diagram of a well known closed loop control circuit.

FIG. 6 is a schematical representation of a two stage servo valve 30 comprising a first stage 31 and a second stage 32. As is shown in FIG. 9, said servo valve 30 can form part of a generally known closed loop circuit and serve for the actuation of a hydraulic cylinder 37. Still refering to both FIG. 6 and FIG. 9 it is recognized, that FIG. 6 discloses a position measuring system 36 located at the second stage 32. As it is shown in FIG. 9, that position measuring system 36 could also be located at the hydraulic cylinder 37.

Returning now to the description of FIG. 6 it is noted that the servo valve 30 is actuable by means of an electrical input signal 28, so as to cause the movement of an adjustment or control spool 35, which is reciprocally mounted in the housing 34 of a control valve 134. The control spool 35 is part of the second stage of the two stage servo valve 30. The ports of the second stage 32 are referred to by P, A, T and B. Naturally, a hydraulic cylinder 37 to be actuated is located between the ports A and B.

While the second stage 32 is of well known design, the design of the first stage 31 follows the principles of the present invention and will now be described in some detail.

The first stage 31 receives at its input side the already mentioned electrical signal 28 so as to supply at its output side a hydraulic output signal which is generally refered to by an arrow 29 and which occurs in praxis at the ports $A_{st}$ and $B_{st}$. The hydraulic output signal 29 is connected with the respective control chamber of the control valve 134 having a control spool 35. The pump port P and the tank port T of the control 134 are suitably connected with the respective ports P and T of the first stage 31 by means of respective channels 50 and 60 with a filter 51 being provided in channel 50.

Four nozzle resistances 41, 42, 43 and 44 are connected in the manner as it is shown in FIG. 6. Specifically, nozzle resistance 41 is connected with its input 18 via a line 47 with the input 18 of the nozzle resistance 44. The output 19 of the nozzle resistance 41 is connected via the conduit 58 and the conduit 48 to the port $A_{st}$ of the control valve 134 and via the line or conduit 58 and a conduit 49 to the input 18 of the nozzle resistance 42. The nozzle resistance 42 is connected with its output 19 via conduit 57 and 52 to the tank port T of the control valve 134 and, on the other hand, the outlet 19 is connected via conduit 57 and a conduit 53 to the output 19 of the nozzle resistance 43. The nozzle resistance 43 is connected with its input 18 via a conduit 56 and a conduit 54 with the port $B_{st}$ of the control valve 134, and moreover, the input 18 is connected via conduit 56 and 55 with output 19 of the nozzle resistance 44.

Figure 7:
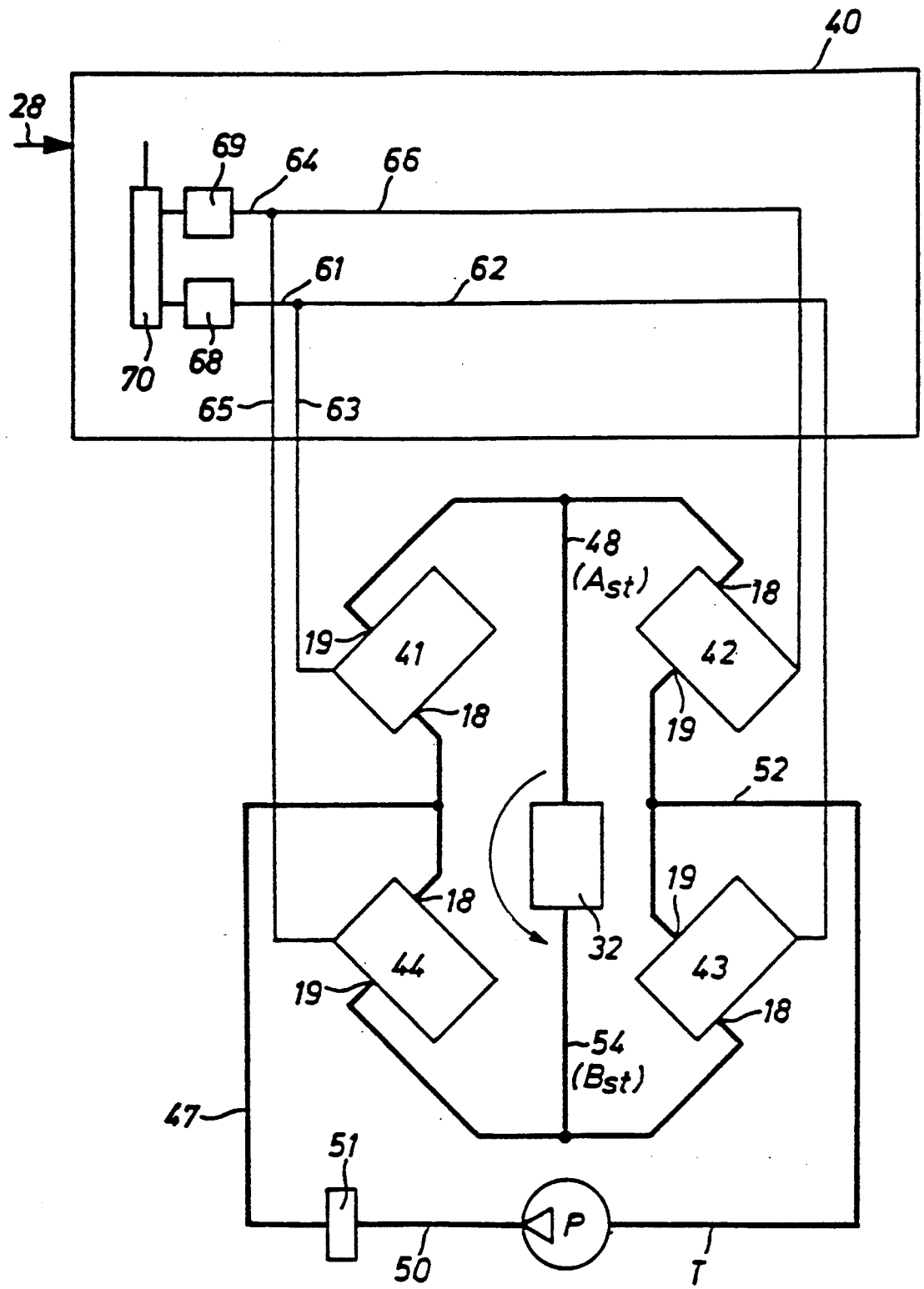
FIG. 7 is a schematic representation of the apparatus of FIG. 6.

As mentioned, FIG. 7 is diagrammatic representation of the circuit of FIG. 6 and it can be readily recognized in FIG. 7 that the nozzle resistances 41 through 44 form a bridge.

Referring simultanously to FIG. 6 and 7, it is noted that the control of the nozzle resistances 41, 42, 43 and 44 occurs by means of a control circuit 40, to which the electrical input or control signal is applied. The control circuit 40 comprises a first control means 68 and a second control means 69. The first control means 68 is connected via lines 61 and 63 to the piezoelectric element of the nozzle resistance 41 and via lines 61 and 62 to the piezoelectric element of the nozzle resistance 43. Moreover, said second control means 69 is connected via lines 64 and 65 to the nozzle resistance 44 and via lines 46 and 66 to the nozzle resistance 42. Both said control means 68 and 69 are connected with a still further circuit 70 into which said electrical signal 28 is inputted in a manner not shown in detail. Besides the electrical signal 28 other control signals can be fed into said control circuit 40, for instance for actuating said control means 68 and 69.

Typically, for a specific servo valve two nozzle resistances of the nozzle resistances 41, 43 and 42, 44 respectively, are adjusted by a predetermined energization (i. e. a predetermined signal) on line 61 having a certain value. The respective, other nozzle resistances 42, 44 are controlled or energized via line 64 depending on the electrical control signal 28, so as to provide for a respective change of the hydraulic output signal 29.

Figure 8:
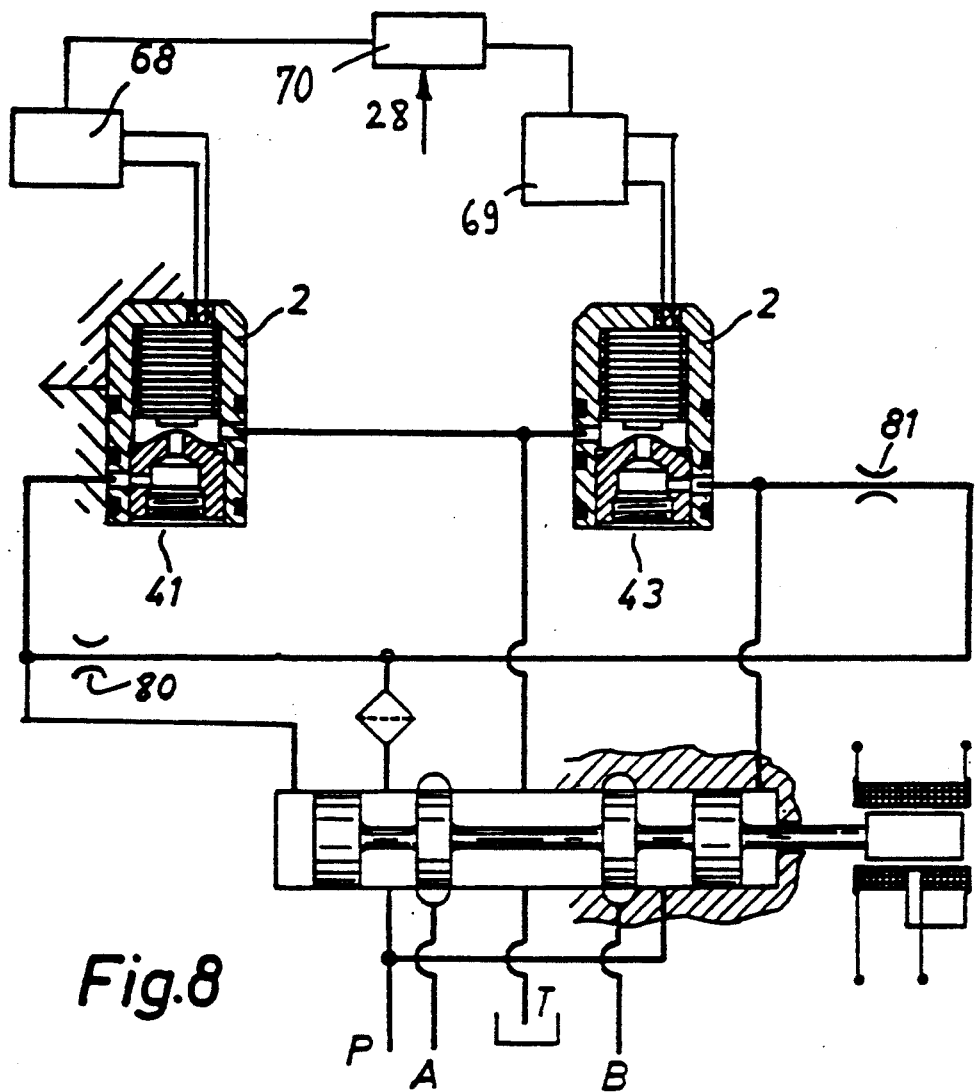
FIG. 8 is another embodiment of an apparatus for generating a hydraulic output signal corresponding to an electric input signal representing a first stage of a two stage servo valve.

FIG. 8 discloses another specific embodiment according to which two nozzle resistances of the design of FIG. 6 are replaced by two fixed orifices or fixed nozzles 80, 81. Apart from this change, the design of FIG. 8 is similar tot he design to FIG. 6 and thus, a more detailed description is not deemed to be necessary for the skilled person.

FIG. 9, already mentioned earlier, discloses a closed loop control circuit within which the servo valve shown in FIG. 6 or 8 can be preferably used.

I claim:

1. A variable hydraulic nozzle resistance means adapted to supply at a hydraulic output a hydraulic signal in accordance with an electric input signal applied to an electric input thereof, said nozzle resistance means comprising:

a housing (2), a piezoelectric means (5) for controlling the movement of a baffle plate (8) based upon the energization of said electrical signal, a nozzle body (11) fixedly mounted within said housing, such that at least one bore (15) extending through said body has one end located adjacent to said baffle plate (8), a second chamber (20) within said housing (2) and adapted to be connected to a fluid pressure source and further in communication with said bore (15), a first chamber (21) within said housing separated from said second chamber (20) but in communication with said bore (15), outlet means (17) in connection with said first chamber (21) to supply said hydraulic output signal (19) to a user, and wherein the distance $X_o$ between the one end of said bore (15) ending in said first chamber (21) and the surface of the baffle plate (8) is reduced when the input signal is applied to said piezoelectric means, said reduction of distance being in accordance with the size of said electric input signal, so as to cause a respective variation of the hydraulic output signal (19).

2. An apparatus for generating a hydraulic output signal corresponding to an electrical input control signal, said apparatus comprising:

a bridge circuit including a first and a second pair of branches, said branches being connected to form two pairs of two diagonal points, wherein one of said pairs of points is referred to as an output pair of points adapted to supply said hydraulic output signal to a user, wherein the other of said pairs of points is referred to as pressure input pair of points and is adapted for connection to a source of pressure medium, wherein the two pairs of branches extend between said pressure input pair of points and comprise:

in said first pair of branches, a first serial connection of a nozzle resistance controlled by a piezoelectric element and a fixed orifice, and in said second pair of branches, a second serial connection of a nozzle resistance controlled by a piezoelectic element and a fixed orifice, said first and second pairs of branches being connected in parallel.

3. An apparatus as in claim 2, wherein said bridge circuit forms a first stage of a two stage servo valve, said bridge circuit supplying said output control signal which is supplied to a second stage (32) of said two stage servo valve (30).

4. An apparatus as in claim 2, wherein each said nozzle resistance is adapted to supply at a hydraulic output said hydraulic signal in accordance with an electrical input signal, each said nozzle resistance comprising:

a housing (2), piezoelectric means for controlling the movement of a baffle plate (8) based upon the energization of said electrical signal, a nozzle body (11) fixedly mounted within said housing, such that a bore (15) extending through said body has one end located adjacent to said baffle plate (8), a second chamber (20) within said housing (2) and adapted to be connected to said fluid pressure source and further in communication with said bore (15), a first chamber (21) within said housing separated from said second chamber (20) but in communication with said bore (15), outlet means (17) in connection with said first chamber (21) to supply said hydraulic output signal (19) to a user, and wherein a distance $X_o$ between the one end of said ore (15) ending in said first chamber (21) and the surface of the baffle plate (8) is reduced when said input signal is applied to said piezoelectic means in accordance with the size of said input signal, so as to case a respective variation of the hydraulic output signal (19).

5. An apparatus for generating a hydraulic output signal corresponding to an electrical input control signal, said apparatus comprising:

a bridge circuit including a first and second pair of branches, said branches being connected to form two pairs of two diagonal points, wherein one of said pairs of points is referred to as an output pair of points adapted to supply said hydraulic output signal to a user, wherein the other of said pairs of points is referred to as a pressure input pair of points and is adapted for connection to a source of pressure medium, wherein the two pairs of branches extend between said pressure input pair of points and comprise:

in said first pair of branches, a first serial connection of a nozzle resistance controlled by a piezoelectric element and another nozzle resistance controlled by a piezoelectric element, and in said second pair of branches, a second serial connection of a nozzle resistance controlled by a piezoelectric element and another nozzle resistance controlled by a piezoelectric element, said first and second pairs of branches being connected in parallel.

6. An apparatus as in claim 5, wherein said bridge circuit forms a first stage of a two stage servo valve, said bridge circuit supplying said output control signal which is supplied to a second state (32) of said two stage servo valve (30).

7. An apparatus as in claim 6, wherein said two diagonally arranged nozzle resistances are controlled by said input control signal (28) and the two other also diagonally arranged nozzle resistances are controlled such that they assume a predetermined hydraulic resistance.

8. An apparatus as in claim 5, wherein each said nozzle resistance is adapted to supply at a hydraulic output said hydraulic signal in accordance with said electrical input signal, each said nozzle resistance comprising:

a housing (2), said piezoelectric means for controlling the movement of a baffle plate (8) based upon the energization of said electrical signal, a nozzle body (11) fixedly mounted within said housing, such that a bore (15) extending through said body has one end located adjacent to said baffle plate (8), a second chamber (20) within said housing (2) and adapted to be connected to said fluid pressure source and further in communication with said bore (15), a first chamber (21) within said housing separated from said second chamber (20) but in communication with said bore (15), outlet means (17) in connection with said first chamber (21) to supply said hydraulic output signal (19) to a user, and wherein a distance $X_o$ between the one end of said bore (15) ending in said first chamber (21) and the surface of the baffle plate (8) is reduced when said input signal is applied to said piezoelectric means in accordance with the size of said electric input signal, so as to cause a respective variation of the hydraulic output signal (19).

* * * * *